United States Patent
Soliman et al.

(10) Patent No.: US 8,061,462 B2
(45) Date of Patent: Nov. 22, 2011

(54) TRANSMISSION UPSHIFT INPUT TORQUE MODULATION FOR A HYBRID ELECTRIC VEHICLE

(75) Inventors: Ihab S. Soliman, Warren, MI (US); Andrew J. Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 12/047,529

(22) Filed: Mar. 13, 2008

(65) Prior Publication Data

US 2009/0233758 A1  Sep. 17, 2009

(51) Int. Cl.
*B60W 10/08* (2006.01)
(52) U.S. Cl. ............ 180/65.265; 180/65.285; 180/65.28
(58) Field of Classification Search ............. 180/65.265, 180/65.285; 477/15, 20
See application file for complete search history.

(56) References Cited

U.S. PATENT DOCUMENTS

| | | | |
|---|---|---|---|
| 5,943,918 A * | 8/1999 | Reed et al. ...................... | 74/661 |
| 6,988,976 B2 * | 1/2006 | Potter ........................... | 477/115 |
| 7,261,670 B2 * | 8/2007 | Endo et al. ........................ | 477/3 |
| 7,460,943 B2 * | 12/2008 | Yamamoto et al. ............. | 701/52 |
| 7,552,003 B2 * | 6/2009 | Suzuki et al. ................... | 701/51 |
| 7,575,078 B2 * | 8/2009 | Muta et al. .............. | 180/65.265 |
| 2009/0233758 A1 * | 9/2009 | Soliman et al. ................... | 477/3 |

* cited by examiner

*Primary Examiner* — Jeffrey J Restifo
(74) *Attorney, Agent, or Firm* — David B. Kelley; MacMillan, Sobanski & Todd, LLC

(57) ABSTRACT

In a powertrain for motor vehicle that includes an engine, an electric machine able to function alternately as a motor and a generator, and a transmission whose input is driveably connected to the engine and the electric machine, a method for controlling transmission input torque during an upshift including using the engine to produce torque transmitted to the transmission input, during the ratio change phase of the upshift, operating the electric machine as a generator, and during the ratio change phase of the upshift, controlling a net torque transmitted to the transmission input by using the engine to drive the transmission and the electric machine concurrently.

17 Claims, 8 Drawing Sheets

US 8,061,462 B2

TRANSMISSION UPSHIFT INPUT TORQUE MODULATION FOR A HYBRID ELECTRIC VEHICLE

BACKGROUND OF THE INVENTION

1. Field of the Invention

This invention relates generally to a powertrain for a hybrid electric vehicle (HEV), and, in particular to a method for performing transmission input torque modulation during a change to a higher gear.

2. Description of the Prior Art

In a conventional vehicle equipped with a transmission that produces step changes among gear ratios, the driver can experience driveline disturbances during a gear shift. The driveline disturbances occur due to the acceleration and deceleration of the engine and transmission component inertias, which produce an inertial torque during the gear shift. In the case of an upshift, the transmission output torque increases during the ratio change phase of the gear shift as a result of the engine speed changing.

This output torque disturbance is directly felt by occupants of the vehicle and affects shift quality. The level of output shaft torque disturbance increases with the speed of the upshift since engine deceleration is greater with faster gear shifts. By reducing engine torque produced during the upshift, inertial torque can be offset and the output shaft torque increase can be minimized, thereby improving shift quality. The method of reducing engine torque produced during the upshift is referred to as "input torque modulation" control.

In the case of a downshift, the transmission output torque decreases during the ratio change phase as the engine and transmission components accelerate to the synchronous speed for the lower gear. Moreover, during the torque transfer phase of the downshift, the transmission output torque can spike near the completion of the downshift as the engine accelerates. The drop in output torque during the ratio change is directly felt by the vehicle occupants and can give the sense of an acceleration discontinuity as the downshift is performed. The output torque spike at the end of the downshift can affect shift quality and produce a feeling of a rough shift. Furthermore, the level of output shaft torque drop and spike near the end of the downshift will increase in proportion to speed of the downshift.

By using input torque modulation, the engine combustion torque can be reduced near the end of the downshift in order to reduce the engine's acceleration as the shift ends. As a result, the transmission output torque spike can be minimized and avoided, thereby reducing the shift disturbance.

In conventional vehicle applications, limitations and problems with input torque modulation during gear shifts include limited engine torque reduction authority due to constraints, such as emissions; delayed engine torque response to torque modulation requests, further degrading shift quality; and poor fuel efficiency, since spark retardation is commonly used for achieving torque modulation requests.

SUMMARY OF THE INVENTION

In a powertrain for motor vehicle that includes an engine, an electric machine able to function alternately as a motor and a generator, and a transmission whose input is driveably connected to the engine and the electric machine, a method for controlling transmission input torque during an upshift including using the engine to produce torque transmitted to the transmission input, during the ratio change phase of the upshift, operating the electric machine as a generator, and during an ratio change phase of the upshift, controlling a net torque transmitted to the transmission input by using the engine to drive the transmission and the electric machine concurrently. The engine torque and torque required to drive the electric machine can be varied during the ratio change phase.

During a transmission shift event, the electric machine is controlled to produce accurately a transmission input torque modulation request. By taking advantage of the electric machine's capability, output shaft torque disturbances are reduced and optimum shift quality is achieved.

The transmission input torque modulation control strategy can be applied to HEV powertrains including rear wheel drive, front wheel drive and all wheel drive configurations, full HEV, mild HEV having at least one electric machine at the transmission input. Furthermore, this control strategy is applicable to conventional automatic transmission, dual clutch powershift transmissions, and converterless automatic transmissions.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
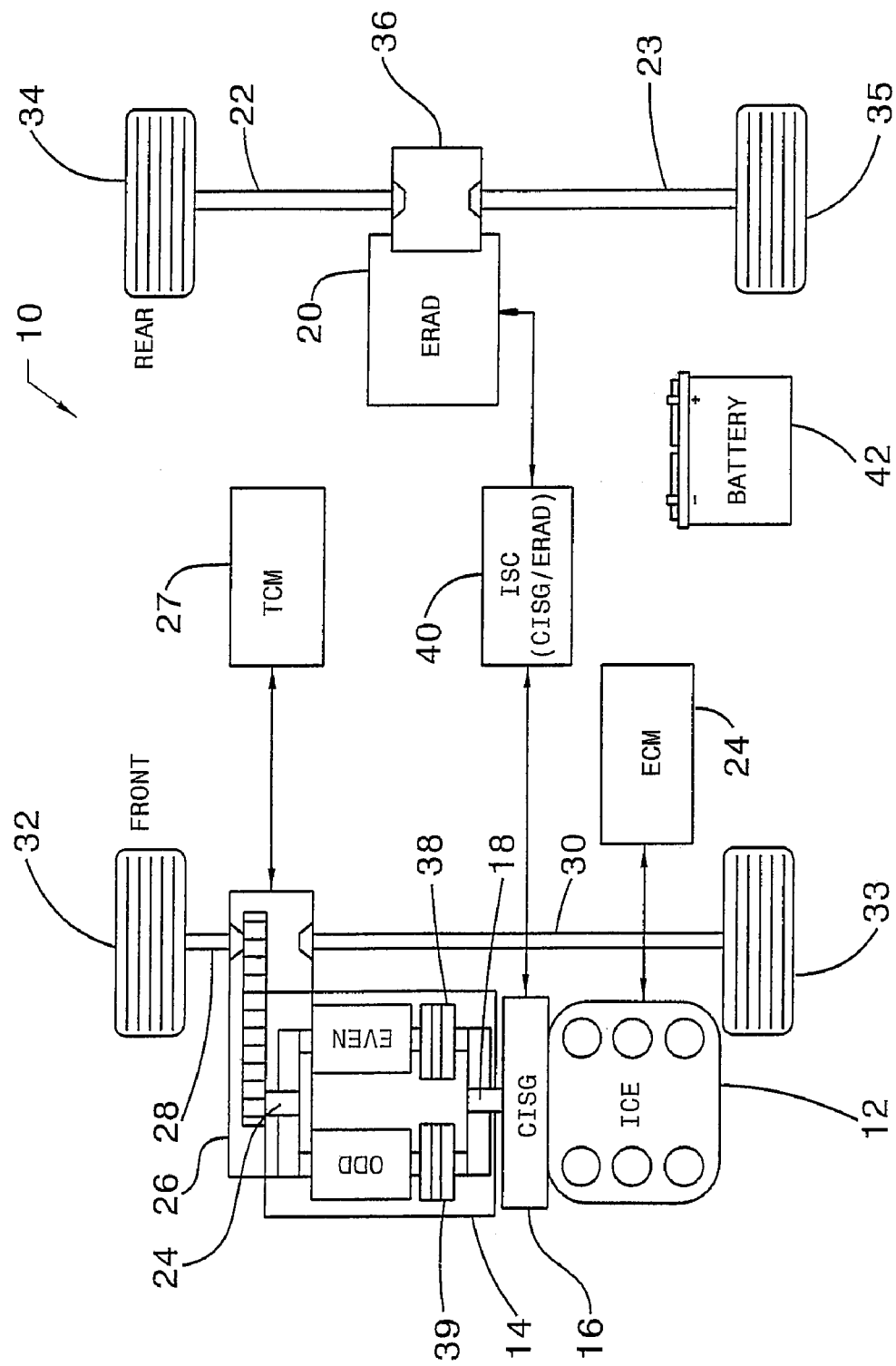
FIG. 1 is a schematic diagram showing an automotive vehicle powertrain for a hybrid electric vehicle.
Figure 2:
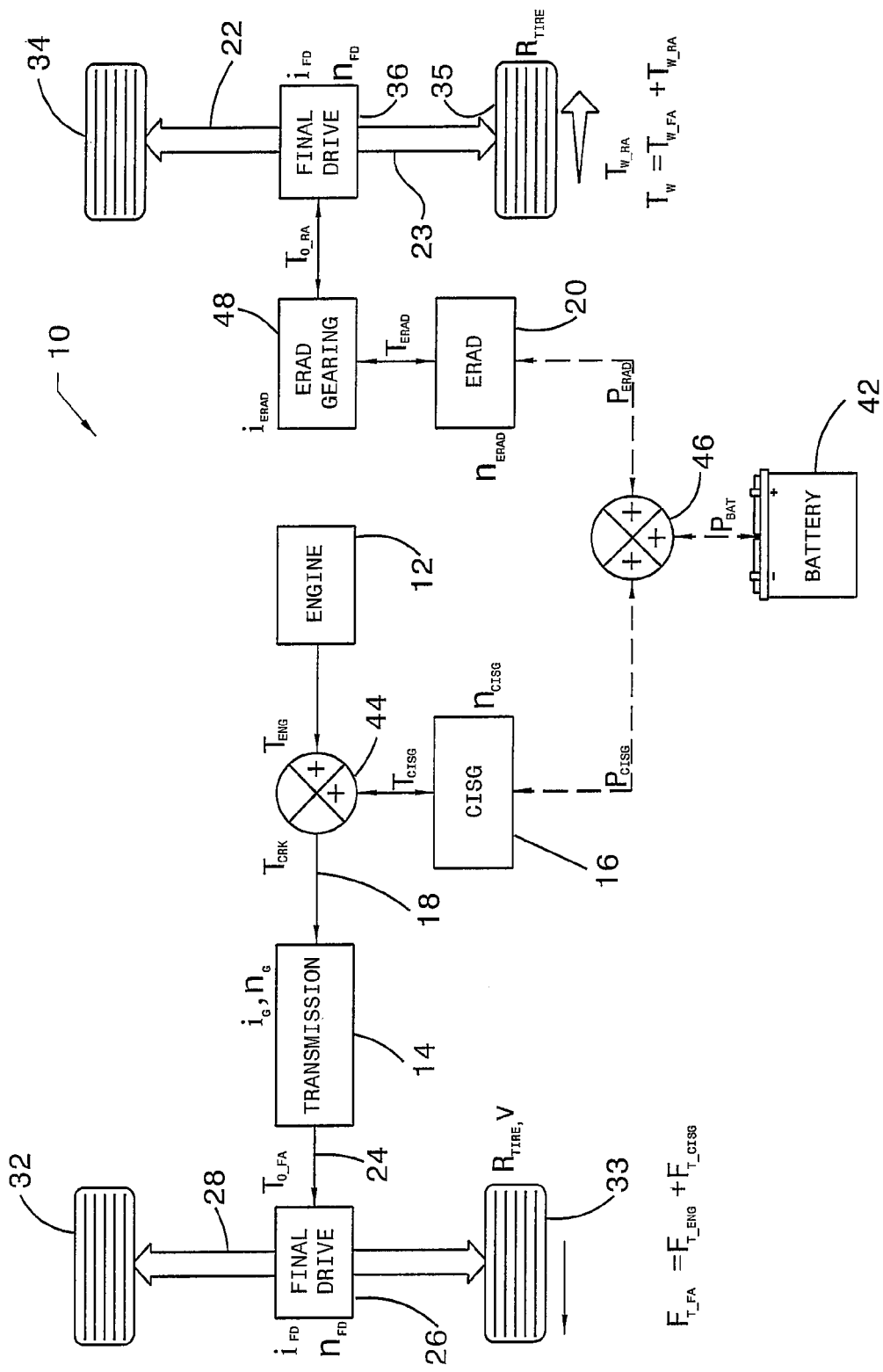
FIG. 2 is a schematic diagram showing propulsion and power flow of the vehicle powertrain of FIG. 1.

Referring first to FIGS. 1 and 2, the powertrain 10 configuration includes a first power source such as an internal combustion engine 12, a diesel engine or a gasoline engine; a power transmission 14 producing multiple forward and reverse gear ratios, such as a wet-clutch powershift transmission; an electric machine 16 driveably connected to the engine crankshaft and transmission input 18, such as a crankshaft-integrated starter/generator (CISG) for providing starter/generator capability; and an additional electric machine 20 driveably connected to a rear axle differential mechanism 36, such as an electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, 35 through ERAD gearing 48, a differential mechanism 36, rear axles 22, 23 and wheels 34, 35.

The powertrain 10 comprises a first power path driveably connected to the load that includes CISG 16, transmission 14, final drive unit 26, axles 28, 30 and the wheels 32, 33. A gear of the transmission must be engaged between input 18 and output 24 and the input clutch 38 or 39 that is associated with the engaged gear must be engaged to complete a drive path between CISG 16 and the vehicle wheels 32, 33. Powertrain 10 also comprises a second power path driveably connected to the load that includes ERAD 20, ERAD gearing 48, a differential mechanism 36, rear axles 22, 23 and wheels 34, 35.

An electronic engine control module (ECM) 24 controls operation of engine 12. An electronic transmission control module (TCM) 27 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

FIG. 2 shows the power and energy flow paths from the power sources 12, 16, 20 to the load at the vehicle wheels 32-35. Power produced by engine 12 and power produced by CISG 16 are combined at 44 and transmitted to the transmission input 18. Electric power produced by both electric machines 16, 20 is combinable at 46 for charging the battery 42, or is transmitted from the battery to the electric machines. Mechanical power produced by ERAD 20 is transmitted through ERAD gearing 48 to the load at the rear wheels 34, 35 through the rear final drive 36.

In a hybrid electric vehicle application in which a fixed-ratio transmission is used and at least one electric machine is coupled to the engine crankshaft 18 to provide engine start/stop capability such as a crankshaft integrated starter/generator (CISG) 16, enhanced input torque modulation can be provided during transmission shifts in a superior method compared to that of a conventional input torque modulation strategy.

Figure 3:
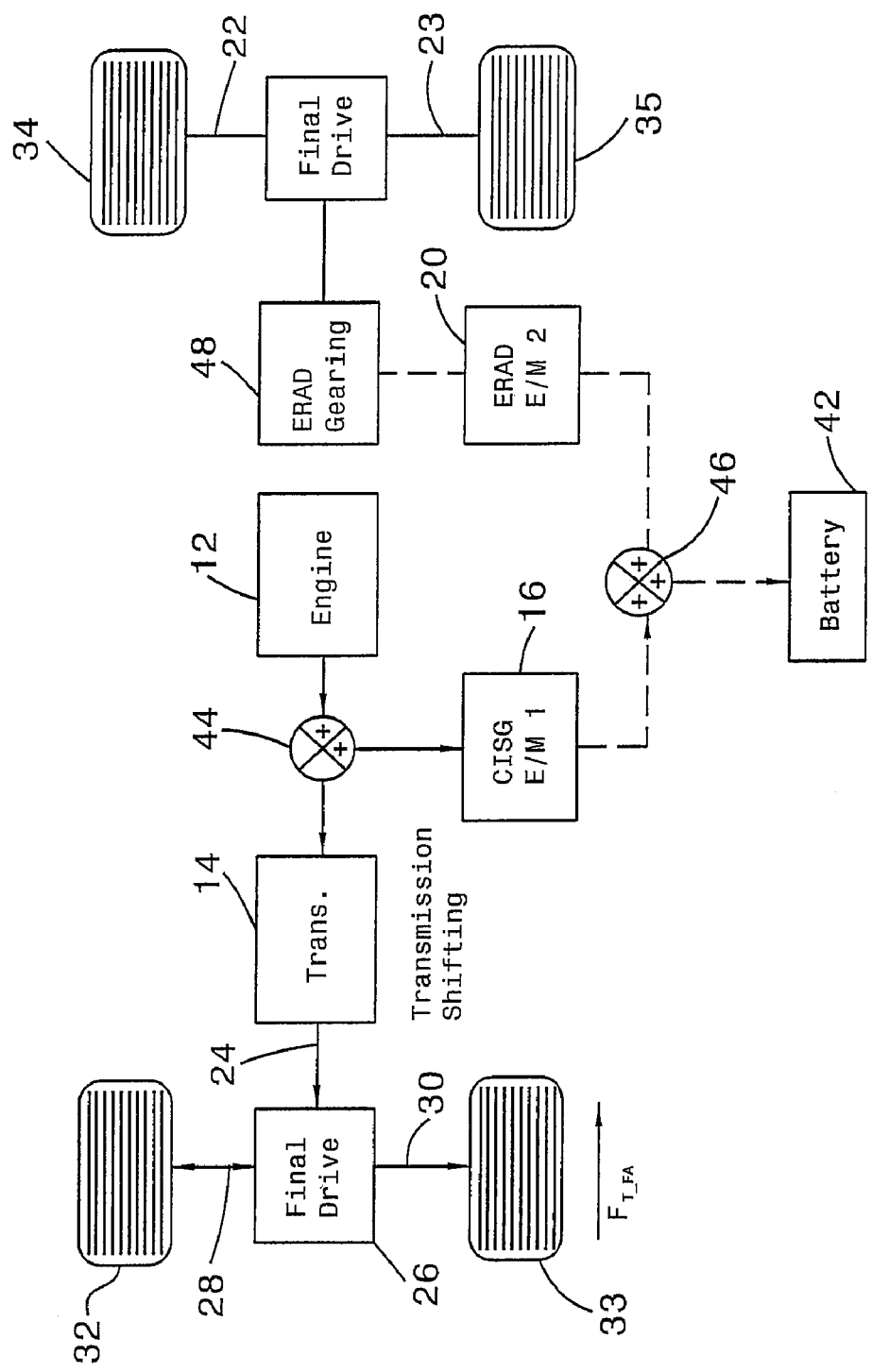
FIG. 3 is a schematic diagram showing vectors representing torque transmission among components of the powertrain operating in mode A.
Figure 4:
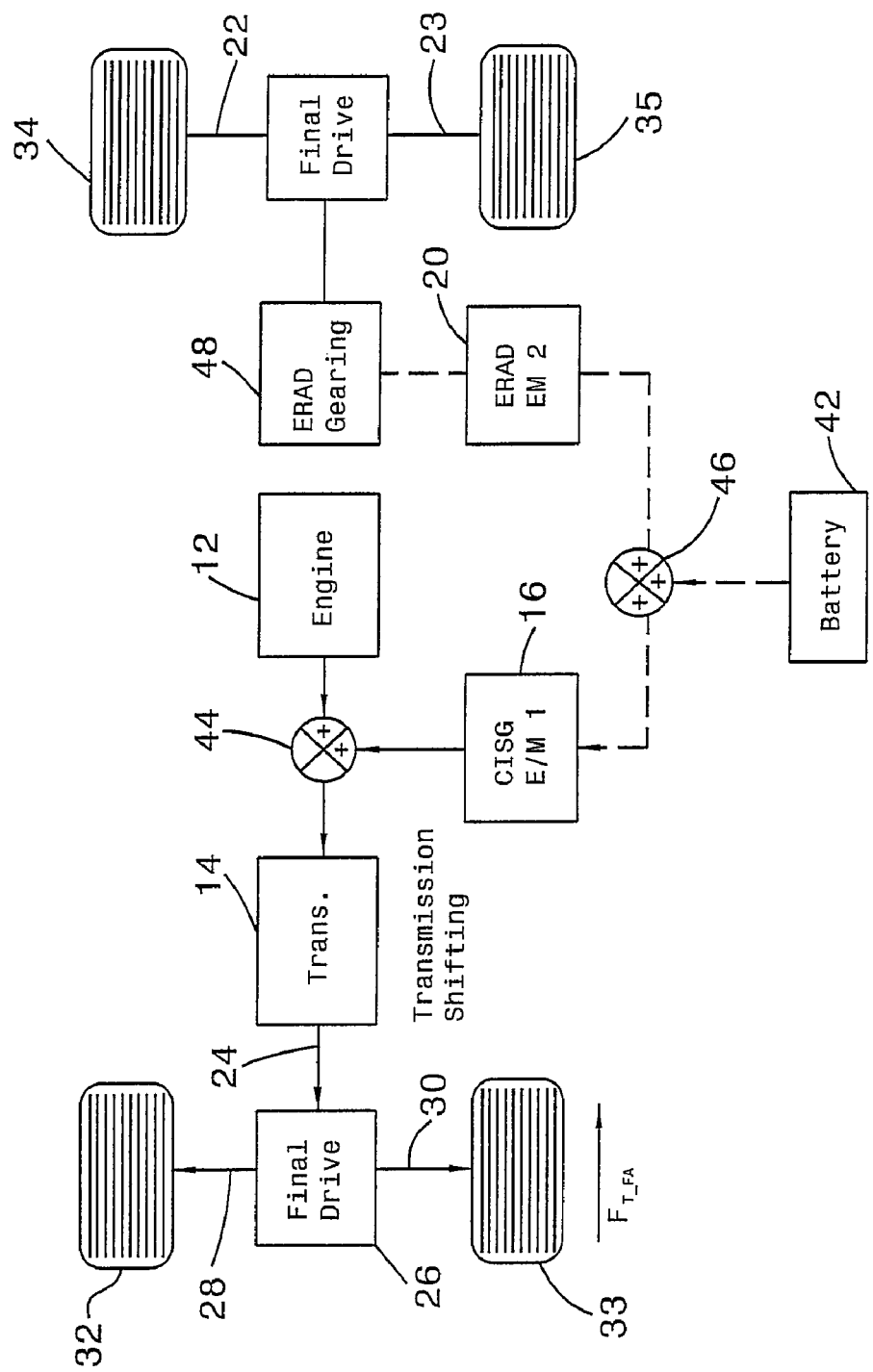
FIG. 4 is a schematic diagram showing vectors representing torque transmission among components of the powertrain operating in mode B.

As shown in FIGS. 3 and 4, operating modes of the powertrain 10 are used to provide transmission input torque modulation during transmission shift events. Depending on the type of shift event, i.e., an upshift or downshift, level of torque modulation request, CISG operating conditions, battery conditions, and other factors, the appropriate powertrain operating mode will be used to provide the desired input torque modulation request. FIG. 3 is a schematic diagram of the powertrain 10 showing vectors representing torque transmission among components during operating mode A, in which the CISG 16 reduces transmission output torque during an upshift.

FIGS. 5A-5D illustrate the change of certain powertrain variables during a transmission upshift in which input torque modulation is provided by the CISG 16 using operating mode A, whose power flow among powertrain components is illustrated in FIG. 3. In operating mode A, CISG 16 operates as an electric generator to provide input torque modulation and to reduce the transmission output torque disturbance 50 that would result if no torque modulation were being performed. CISG is operative for this purpose provided that the CISG is available, i.e., its current temperature is less than its temperature limit, its speed is less than its operational speed limit, etc., and the battery state of charge (SOC) is below the maximum allowable limit.

In operating mode A, CISG 16 is driven by engine 12, thereby reducing the net torque 52 transmitted by crankshaft 18 to the input of transmission 14 during the ratio change phase 54 of the upshift, i.e., while the change gear ratio change 56 is occurring following the torque transfer phase 55. The negative CISG torque 58, which is controlled to provide input torque modulation during the shifts is shown in FIG. 5D. As shown in FIG. 5C, excess torque 60 produced by engine 12 during the ratio change phase is recovered and converted into electrical energy that is stored by the battery 42, while achieving the requested input torque modulation and providing optimum shift quality.

Figure 5A:
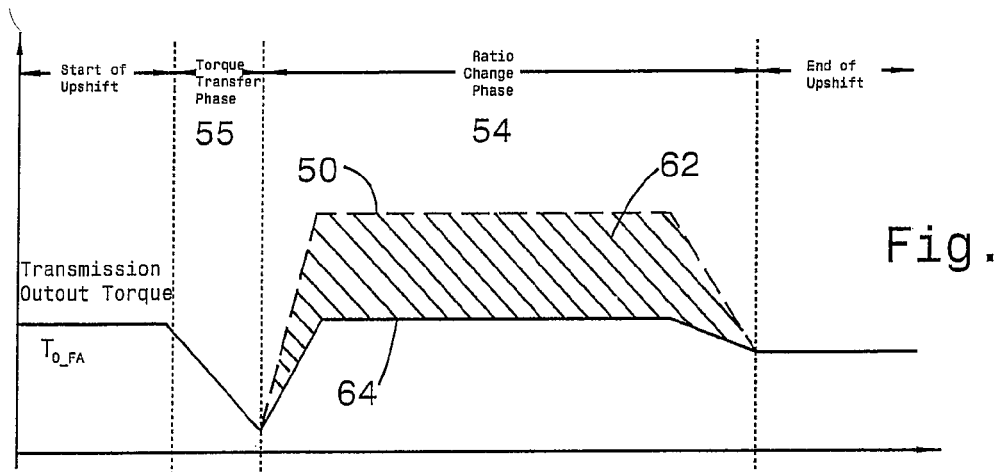
FIGS. 5A-5D illustrate the change of powertrain variables during a transmission upshift performed with input torque modulation.
Figure 5B:
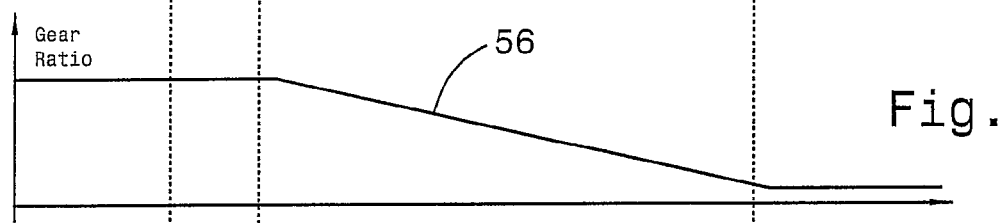
Figure 5C:
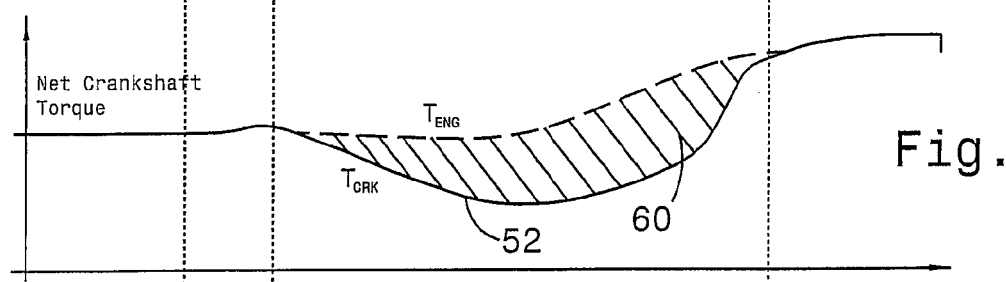
Figure 5D:
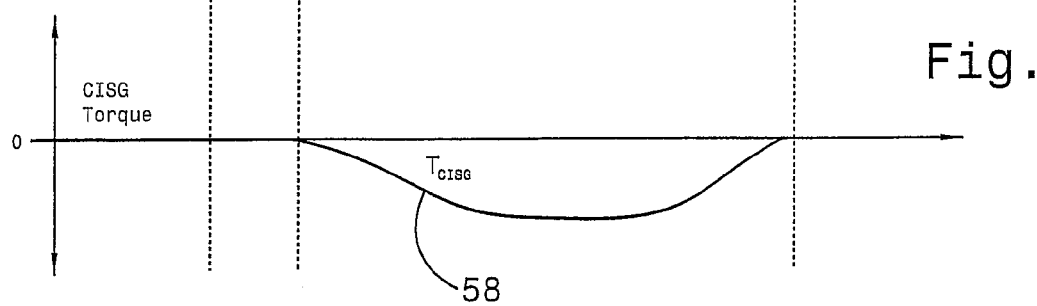

FIG. 5A illustrates the difference 62 between the magnitude of torque 64 at the transmission output shaft 24 with CISG 16 providing input torque modulation for optimum shift quality and the output torque 50 with no input torque modulation provided.

Delays in crankshaft torque reduction can be avoided by taking advantage of the responsiveness of CISG 16 thus leading to accurate input torque modulation levels. Operating mode A can also be used with both CISG 16 and engine 12 reducing the net crankshaft torque to meet the requested input torque modulation level. This is useful in the case where the CISG may not be fully available for input torque modulation or the battery SOC is near its maximum limit.

FIGS. 6A-6D illustrate the change of certain powertrain variables during a transmission downshift in which input torque modulation is provided by the CISG 16 using both operating modes A and B, whose power flow among powertrain components is illustrated in FIGS. 3 and 4, respectively.

Figure 6A:
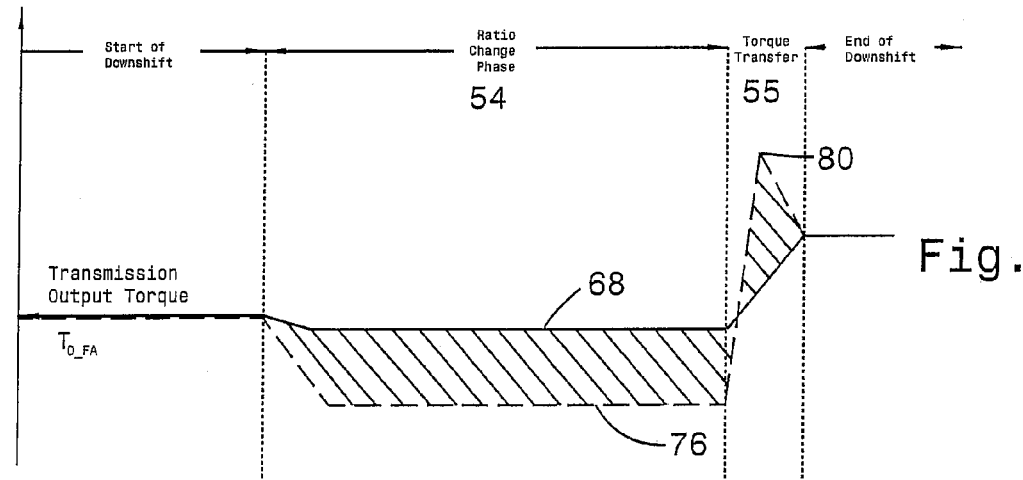
FIGS. 6A-6D illustrate the change of powertrain variables during a transmission downshift performed with input torque modulation.
Figure 6B:
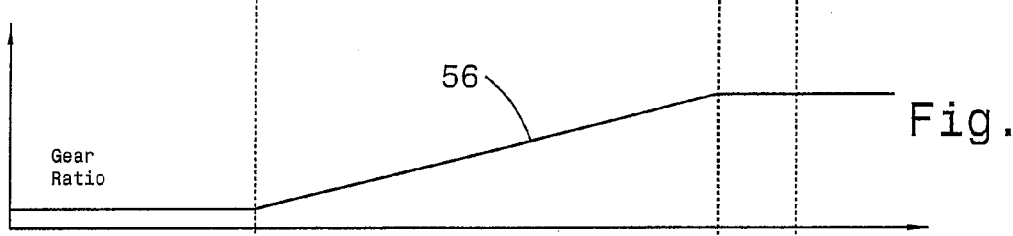

As FIG. 6A shows, during the ratio change or ratio change phase 54 of the downshift, powertrain 10 is placed in operating mode B as shown in FIG. 4, wherein CISG 16 operates as an electric motor to increase the transmission output torque to a level 68 rather than a output torque drop 76 that would result if no torque modulation were being performed. During the ratio change phase 54 of the downshift, CISG torque 70 supplements the engine torque 72 so that the net crankshaft torque 74 is increased to output shaft torque level 68 in order to offset the transmission output torque decrease 76, which would occur without torque modulation. This would provide acceleration continuity during the downshift and improved shift performance.

Operating mode B is used provided that the CISG 16 is available, i.e., its current temperature is less than its temperature limit, its speed is less than its operational speed limit, and the battery state of charge (SOC) is greater than the minimum allowable limit. This CISG capability is unique to that of an HEV since the CISG can be used to offset the output torque drop 76 so that the driver can sense acceleration continuity during the downshift.

Figure 6C:
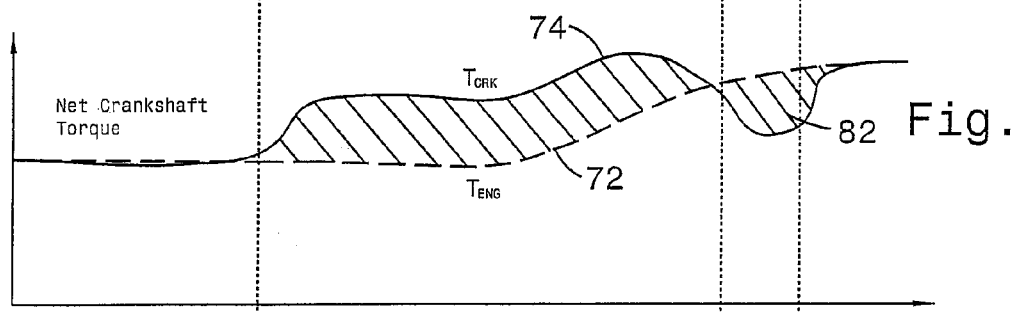
Figure 6D:
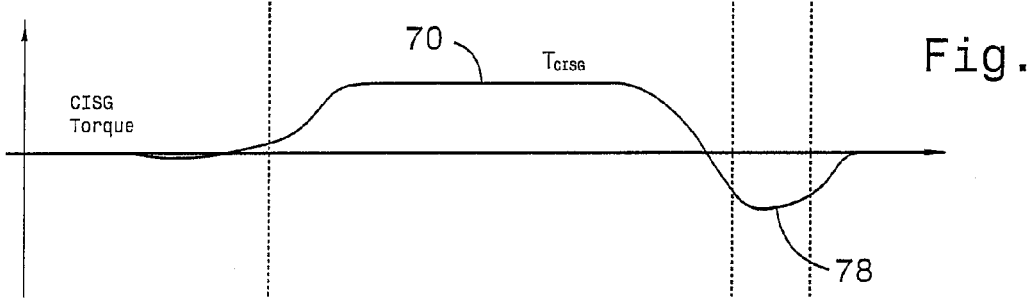

During the torque transfer phase 55 near the completion of the downshift, as shown in FIGS. 6A and 6C, powertrain 10 functions in operating mode A with CISG 16 operating as a electric generator in order to provide input torque modulation. As shown in FIGS. 6C and 6D, CISG 16 is controlled to a negative torque 78 near the end of the downshift during the torque transfer phase to provide torque modulation so that the net crankshaft torque 74 is reduced in order to minimize or eliminate the transmission output torque spike 80, which would normally occur without the CISG providing torque modulation. This excess crankshaft torque 82 produced by the engine 12 is converted to electrical energy and stored by the battery 42, while achieving the requested input torque modulation and providing optimum shift quality. Moreover, by taking advantage of the responsiveness of CISG 16, delays in crankshaft torque reduction can be avoided thus leading to accurate input torque modulation control during the downshift.

Figure 7:
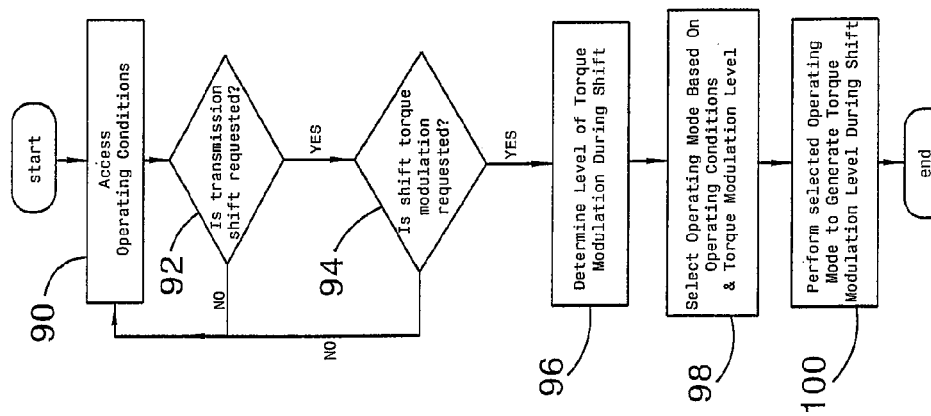
FIG. 7 is a logic flow diagram of an algorithm for providing input torque modulation transmission control in the HEV powertrain of FIG. 1.

FIG. 7 shows the steps of an algorithm for providing input torque modulation transmission control of the HEV powertrain of FIG. 1. After execution of the algorithm is started and the operating conditions of powertrain 10 are assessed at step 90, a test is performed at step 92 to determine whether a gear ratio change of the transmission 14 has been requested by a transmission controller acting in response to vehicle parameters that include without limitation engine throttle position, accelerator pedal position, vehicle speed, engine speed, the position of a manually operated gear selector, and a schedule of the preferred gear ratios related to the vehicle parameters.

If the result of test 92 is logically positive, control advances to step 94 where a test is performed to determine whether shift input torque modulation is requested by the controller. If the result of either test 92 or 94 is logically negative, control returns to step 90. But if the result of test 94 is positive, the magnitude of desired input torque modulation is determined at step 96. The desired magnitude of input torque modulation is determined based on the shift event progress. For example, at the beginning of the ratio change phase of an upshift, the desired magnitude will ramp from zero to a negative steady-state level as the ratio change continues and will ramp back to zero as the ratio change phase is completed.

Figure 8:
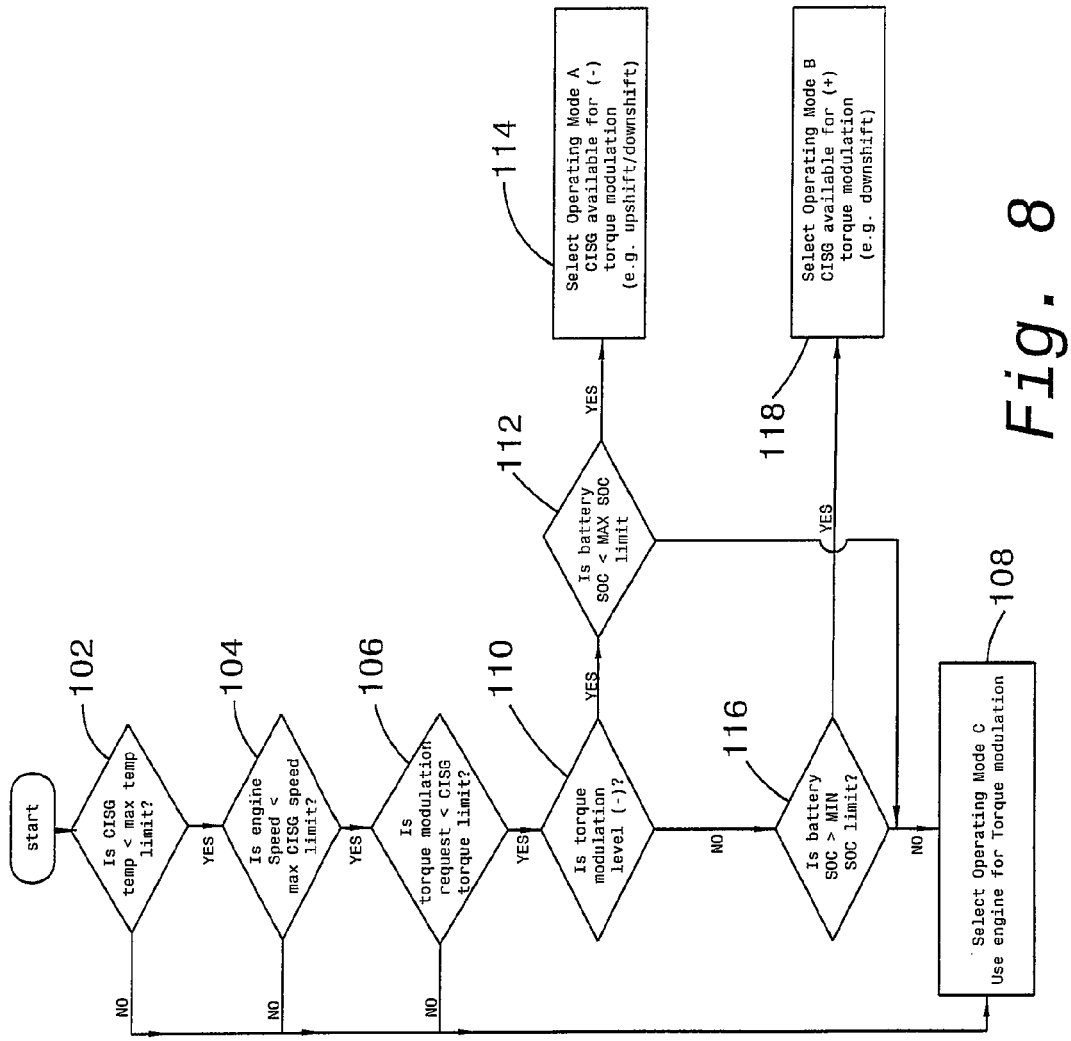
FIG. 8 is a logic flow diagram of an algorithm for selecting the operating mode of the powertrain of FIG. 1 during input torque modulation control.

At step 98, the operating mode of powertrain 10 is selected in accordance with the algorithm of FIG. 8 upon reference to current operating parameters and the desired magnitude of input torque modulation.

At step 100, powertrain 10 is placed in the desired operating mode selected by the algorithm of FIG. 8 in order to provide the desired input torque modulation during the shift event.

Referring now to the algorithm for selecting the desired operating mode shown in FIG. 8, a test is performed at step 102 to determine whether the CISG temperature is less than a high temperature reference.

If the result of test 102 is positive, a test is performed at step 104 to determine whether the speed of CISG 16 is less than a reference speed representing the maximum allowable operating speed of the CISG.

If the result of test 104 is positive, a test is performed at step 106 to determine whether the magnitude of a request for transmission input torque modulation is less than a reference torque limit representing the current maximum torque capability of CISG 16.

Figure 9:
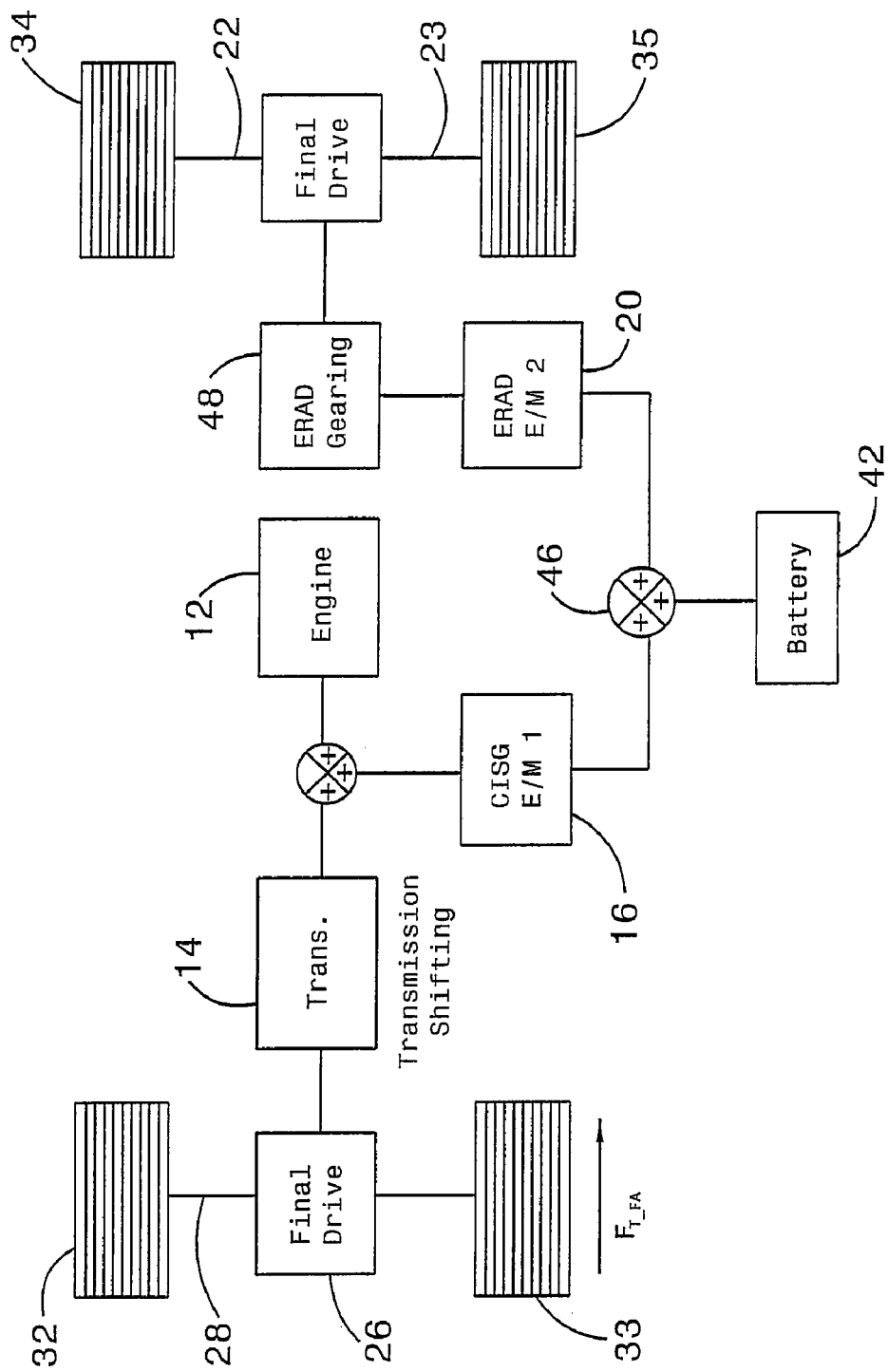
FIG. 9 is a schematic diagram showing vectors representing torque transmission among components of the powertrain operating in mode C.

If the result of any of tests 102, 104 or 106 is negative, control advances to step 108, where powertrain 10 is placed in operating mode C, in which torque produced by engine 12 alone is transmitted to transmission output 24 without CISG torque affecting any change in torque carried on crankshaft 18 to the transmission input and CISG 16 neither produces or draws power. Operating mode C, shown in FIG. 9, is that of a conventional vehicle and the engine torque will be reduced to provide the desired level of input torque modulation since the CISG cannot be used.

If the result of test 106 is positive, a test is performed at step 110 to determine whether the desired magnitude of transmission input torque modulation is negative. If the result of test 110 is positive indicating that the desired input torque modulation level is negative and the crankshaft torque is to be reduced, a test is performed at step 112 to determine whether the battery SOC is less than a maximum allowable SOC reference.

If the result of test 112 is positive indicating that the battery SOC can be further increased as the CISG is operated as an electric generator, at step 114 operating mode A is selected, indicating that CISG 16 is available for input torque modulation by converting power produced by engine 12 into electrical energy to be stored by the battery during an upshift or downshift while achieving the desired input torque modulation level.

If the result of test 112 is negative indicating that the battery SOC cannot be further increased, control advances to step 108, where powertrain 10 is placed in operating mode C, in which torque produced by engine 12 alone is transmitted to transmission output 24 without CISG torque affecting any change in torque carried on crankshaft 18 to the transmission input and CISG 16 neither produces or draws power.

If the result of test 110 is negative indicating that the desired input torque modulation level is positive and the crankshaft torque is to be increased, a test is performed at step 116 to determine whether the battery SOC is greater than a minimum SOC before operating the CISG as an electric motor and discharging the battery.

If the result of test 116 is positive, at step 118 operating mode B is selected, indicating that CISG 16 is available for torque modulation by supplementing power produced by engine 12 during a downshift.

If the result of test 116 is negative, control advances to step 108, where powertrain 10 is placed in operating mode C, in which torque produced by engine 12 alone is transmitted to transmission output 24 without CISG torque affecting any change in torque carried on crankshaft 18.

In accordance with the provisions of the patent statutes, the preferred embodiment has been described. However, it should be noted that the alternate embodiments can be practiced otherwise than as specifically illustrated and described.

The invention claimed is:

1. A method for controlling transmission input torque during an upshift, comprising:
    (a) using an engine to produce transmission input torque;
    (b) during a torque transfer phase of the upshift, maintaining an electric machine inactive;
    (c) if temperature of the electric machine is less than a reference, during a ratio change phase of the upshift, operating the electric machine as a generator to reduce transmission input torque; and
    (d) storing energy produced by the electric machine during the upshift.

2. The method of claim 1 further comprising the step of:
    discontinuing use of the electric machine if the temperature of the electric machine is equal to or greater than the reference.

3. The method of claim 1 further comprising the steps of:
    determining whether a speed of the electric machine is less than a reference speed;
    executing step (c) if the speed of the electric machine is less than the reference speed; and
    discontinuing use of the electric machine if the speed of the electric machine is equal to or greater than the reference speed.

4. The method of claim 1 further comprising the steps of:
    determining whether a desired magnitude of torque modulation is less than a current torque capability of the electric machine;

executing step (c) if the desired magnitude of torque modulation is less than the current torque capability of the electric machine; and discontinuing use of the electric machine if the desired magnitude of torque modulation is equal to or greater than the current torque capability of the electric machine.

5. The method of claim 1 further comprising the steps of:

determining whether a battery state of charge is less than a reference maximum state of charge;

executing step (c) if the battery state of charge is less than the reference maximum state of charge; and discontinuing use of the electric machine if battery state of charge is equal to or greater than the reference maximum state of charge.

6. A method for controlling transmission input torque during an upshift, comprising:
   (a) during a torque transfer phase of the upshift, maintaining an electric machine inactive;
   (b) if temperature of the electric machine is less than a reference, during a ratio change phase of the upshift, operating an electric machine as a generator;
   (c) during the ratio change phase, controlling a net torque transmitted to the transmission input by using the engine to drive the transmission and the electric machine concurrently;
   (d) discontinuing use of the electric machine if said temperature is greater than the reference.

7. The method of claim 6 further comprising the step of storing in a battery energy produced by the electric machine during the upshift.

8. The method of claim 6 wherein step (c) further comprises the step of varying a magnitude of torque required to drive the electric machine.

9. The method of claim 6 further comprising the steps of:

determining whether a speed of the electric machine is less than a reference speed;

executing step (b) if the speed of the electric machine is less than the reference speed; and discontinuing use of the electric machine if the speed of the electric machine is equal to or greater than the reference speed.

10. The method of claim 6 further comprising the steps of:

determining whether a desired magnitude of torque modulation is less than a current torque capability of the electric machine;

executing step (b) if the desired magnitude of torque modulation is less than the current torque capability of the electric machine; and discontinuing use of the electric machine if the desired magnitude of torque modulation is equal to or greater than the current torque capability of the electric machine.

11. The method of claim 6 further comprising the steps of:

determining whether a battery state of charge is less than a reference maximum state of charge;

executing step (b) if the battery state of charge is less than the reference maximum state of charge; and discontinuing use of the electric machine if battery state of charge is equal to or greater than the reference maximum state of charge.

12. A method for controlling transmission input torque during an upshift, comprising:
   (a) during a torque transfer phase of the upshift, maintaining an electric machine inactive;
   (b) if temperature of the electric machine is less than a reference, during a ratio change phase, operating an electric machine as an electric generator;
   (c) during the ratio change phase, producing variable transmission input torque using an engine;
   (d) producing torque transmitted to the transmission input using the engine and the electric machine to drive the transmission input;
   (e) discontinuing use of the electric machine if said temperature is greater than the reference.

13. The method of claim 12 further comprising the step of storing in a battery energy produced by the electric machine during the upshift.

14. The method of claim 12 wherein step (d) further comprises the step of varying a magnitude of torque required to drive the electric machine.

15. The method of claim 12 further comprising the steps of:

determining whether a speed of the electric machine is less than a reference speed;

executing step (b) if the speed of the electric machine is less than the reference speed; and discontinuing use of the electric machine if the speed of the electric machine is equal to or greater than the reference speed.

16. The method of claim 12 further comprising the steps of:

determining whether a desired magnitude of torque modulation is less than a current torque capability of the electric machine;

executing step (b) if the desired magnitude of torque modulation is less than the current torque capability of the electric machine; and discontinuing use of the electric machine if the desired magnitude of torque modulation is equal to or greater than the current torque capability of the electric machine.

17. The method of claim 12 further comprising the steps of:

determining whether a battery state of charge is less than a reference maximum state of charge;

executing step (b) if the battery state of charge is less than the reference maximum state of charge; and discontinuing use of the electric machine if battery state of charge is equal to or greater than the reference maximum state of charge.

* * * * *